Figure 1:
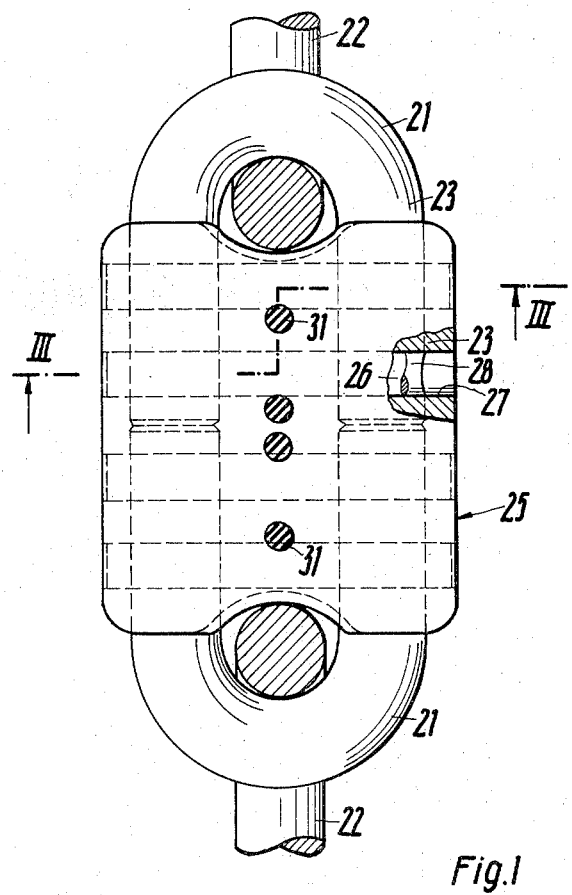

United States Patent [19]
Rieger et al.

[11] 3,822,549
[45] July 9, 1974

[54] CHAIN COUPLERS

[76] Inventors: Werner Rieger, Haus Haselbach, 7084 Unterkochen/Wurttemburg; Hans Horst Dalferth, Haydnstrasse 21, 7083 Wasseralfingen, both of Germany

[22] Filed: July 5, 1972

[21] Appl. No.: 269,283

[30] Foreign Application Priority Data
July 5, 1971 Switzerland.......................... 9822/71
Sept. 21, 1971 Switzerland...................... 13753/71

[52] U.S. Cl. .................................................. 59/85
[51] Int. Cl. ........................................ F16g 15/04
[58] Field of Search.......................... 59/85, 86, 93

[56] References Cited
UNITED STATES PATENTS

| | | | |
|---|---|---|---|
| 2,216,831 | 10/1940 | Robbins | 59/85 |
| 2,406,712 | 8/1946 | Robbins | 59/85 |
| 2,524,935 | 10/1950 | Skold | 59/85 |
| 3,104,519 | 9/1963 | Kelting | 59/86 |
| 3,134,221 | 5/1964 | Bergman | 59/85 |
| 3,373,560 | 3/1968 | Manney | 59/85 |
| 3,404,528 | 10/1968 | Dicus | 59/85 |
| 3,685,285 | 8/1972 | Spilhaug | 59/86 |

FOREIGN PATENTS OR APPLICATIONS
316,681  11/1918  Germany .................. 59/85

*Primary Examiner*—Charles W. Lanham
*Assistant Examiner*—Gene P. Crosby
*Attorney, Agent, or Firm*—Smythe & Moore

[57]  ABSTRACT

This disclosure relates to chain couplers for interconnecting the end links of two chain lengths. The coupler includes two cooperating half links, with each half link having at least one cylindrical leg or shank portion adapted to be inserted within a cylindrical sleeve-like socket of an element fixedly associated with the cooperating half link. Each cylindrical leg portion has grooves on its opposite sides, which are staggered in the coupling direction, there being correspondingly disposed apertures in the element with the sleeve-like socket, for the receipt of locking pins, which engage in the grooves, to lock the cylindrical leg portion in the socket in which it has been inserted. The element with the sleeve-like socket may be integral with the cooperating half link or it may be a separate coupling element interposed to interconnect the two cooperating half links.

14 Claims, 15 Drawing Figures

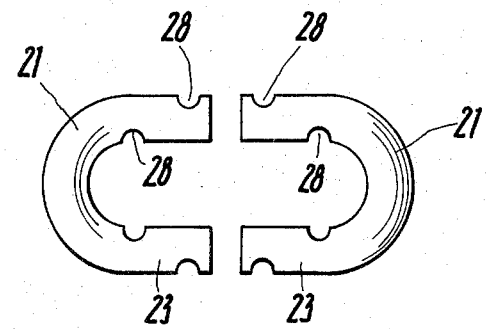
Fig. 7
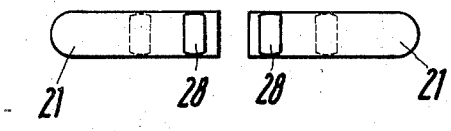
Fig. 8
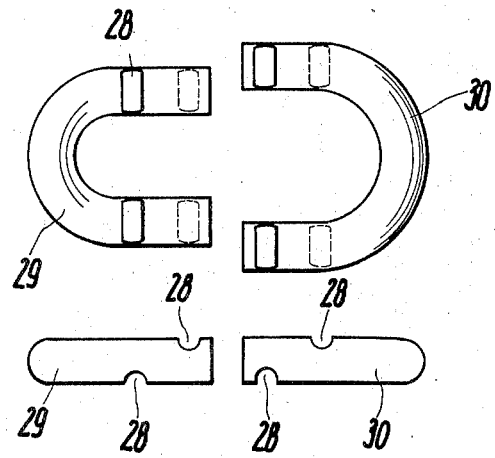
Fig. 9
Fig. 10
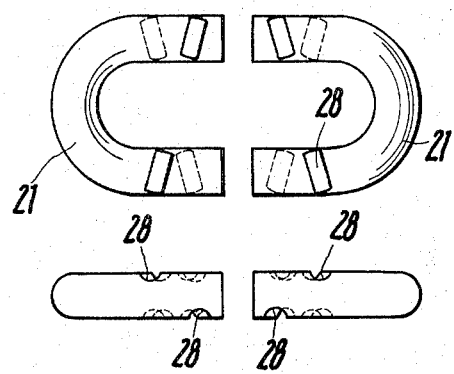
Fig. 11
Fig. 12

CHAIN COUPLERS

This invention relates to a chain coupler comprising two cooperating half links connectable by cylindrical or sleeve-like sockets of coupling elements which are either integral with the half links or are separate coupling elements interposed between the comoperating half links, said half links being provided with grooves on opposite sides of their shank ends which are to be connected together, and part of the circumference of a locking pin projecting into each of said grooves.

Chain couplers of this kind have been proposed in which the ends of the shanks of the U-shaped half links project into bores in a coupling element, said bores being intersected by transverse bores for locking pins which after insertion of the half links project partly into a groove in the coupling element and partly in the shank of the half link. Conventional forms of construction are of very simple design. Nevertheless they are not entirely satisfactory because the shanks of the half links are considerably weakened by the presence of the grooves. The reason is that in conventional chain couplers of the contemplated kind the grooves are located on opposite sides of the shanks in a plane which perpendicularly intersects the shanks of the half links.

The limited strength of conventional chain couplers is not exclusively due to the weakening of the cross section in the region of these grooves, but also to the fact that a single cross section contains two notches which generate peak stresses.

It is the object of the present invention to eliminate the above-described shortcomings and to provide a chain coupler of the hereinabove specified kind in which, notwithstanding the fact that each shank of the half link contains two grooves, the strength of the coupler is still satisfactory.

According to the invention this is achieved in that the ends of the half links that are to be coupled together each contain two grooves which are staggered in the coupling direction.

The proposed chain coupler has the advantage of being much stronger than forms of construction that have in the past been proposed, the term increased strength in this context meaning a higher static strength as well as a better fatigue strength.

Figure 2:
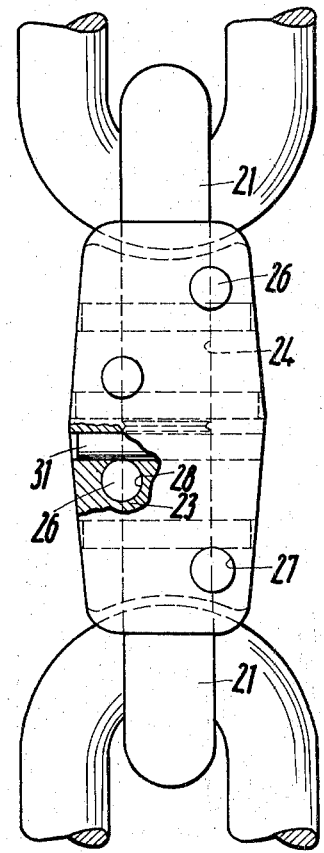
Figure 3:
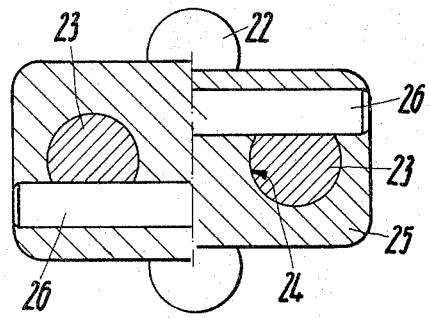
Figure 4:
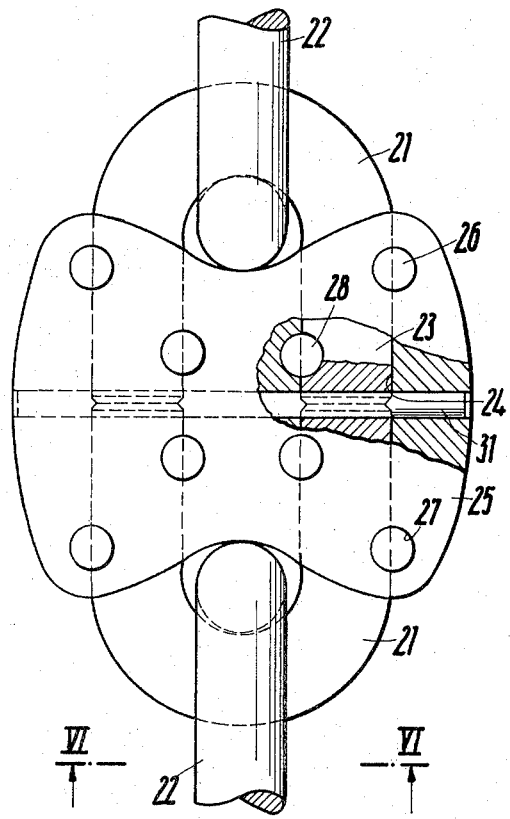
Figure 5:
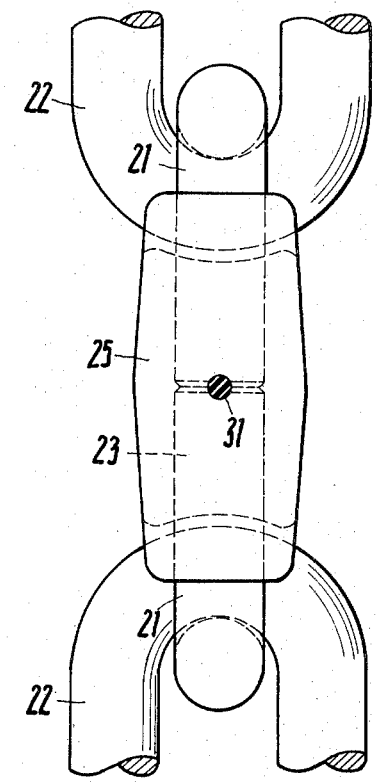
Figure 6:
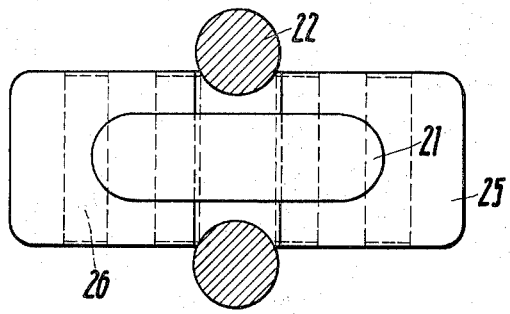
Figure 13:
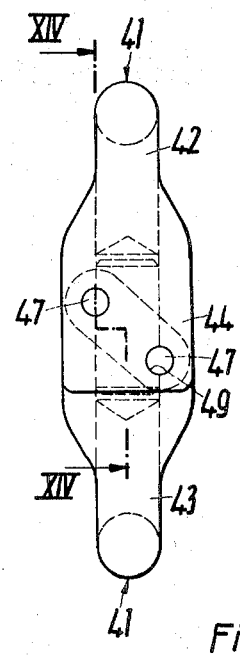
Figure 14:
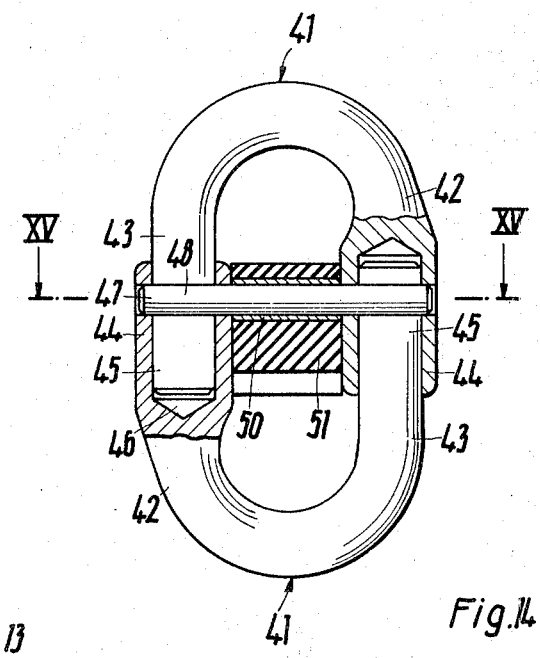
Figure 15:
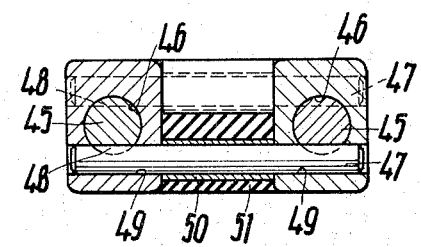

The invention will be hereinafter more particularly described with reference to the accompanying drawings in which FIG. 1 is a view of a chain coupler according to the invention, FIG. 2 is a side view of the chain coupler in FIG. 1, FIG. 3 is a section taken on the line III—III in FIG. 1, FIG. 4 is a view in plan of a different embodiment of a chain coupler according to the invention, FIG. 5 is a side view of the chain coupler according to FIG. 4, FIG. 6 is an end-on view of the proposed chain coupler, seen in the direction of the arrows VI — VI in FIG. 4, FIG. 7 is a view in plan of two half links of a third embodiment of a chain coupler according to the invention, FIG. 8 is a side view of the half links shown in FIG. 7, FIG. 9 is a view in plan of a fourth embodiment of the invention, FIG. 10 is a side view of the half links in FIG. 9, FIG. 11 is a view in plan of the half links of a fifth embodiment according to the invention, FIG. 12 is a side view of the half links in FIG. 11, FIG. 13 is a side view of a sixth embodiment of a chain coupler according to the invention, FIG. 14 is a part sectional plan view of the chain coupler in FIG. 13, and FIG. 15 is a section taken on the line XV — XV in FIG. 14.

Referring to FIG. 1 the final links 22 at the ends of two lengths of chain are connected to the half links 21 of a chain coupler according to the invention. The shanks of the U-shaped half links are inserted into receiving sockets 24 in a locking member 25 where they are held in position by coupling pins 26 in transverse bores 27. To enable the half links 21 to be anchored in the locking member 25 the shanks 23 of the half links 21 are provided with transverse grooves 28 which embrace parts of the circumference of the coupling pins 26 (cf. FIGS. 1 and 2). In the embodiment according to FIGS. 1 to 3 these grooves extend across the shanks 23 of the two U-shaped half links 21 parallel to the median centre plane. This arrangement has the advantage that the grooves will be located in parts of the half links where the resultant conditions of stress are most favourable.

The chain coupler according to FIGS. 4, 5 and 6 is of similar construction to that shown in FIGS. 1 to 3. However, contrary to the first embodiment the grooves in this instance extend across the shanks of the two U-shaped half links perpendicularly to the median centre plane. In order to assist in an understanding of the construction of the chain coupler in FIGS. 4, 5 and 6 parts equivalent to those in FIGS. 1 to 3 are identified by the same reference numbers.

In this second embodiment the chain coupler likewise comprises two half links 21 which are of identical size and shape and intended to be interlinked with the last links of two chain lengths that are to be coupled. The shanks 23 of the half links 21 are again inserted into sockets 24 in a locking member 25. For anchoring the shanks 23 in the locking member 25 coupling elements 26 are inserted into transverse bores 27 passing through the locking member in register with grooves 28 in the ends of the shanks 23. As will be understood, more particularly by reference to FIG. 4, the chain coupler in FIGS. 4 to 6 is characterised by being of symmetrical design.

Numerous modifications of a chain coupler according to the invention can be devised. For instance, FIGS. 7 and 8 show the half links 21 of a coupler in which the shanks 23 are provided with grooves 28 analogous to the shanks of the half links of the coupler in FIGS. 4 to 8. Whereas in the previously described embodiment the grooves in the ends of the shanks of the half links are situated on the sides of the shanks facing inwards, they are on the outside of the shanks in the embodiment according to FIGS. 6 to 8. For the sake of greater clarity the locking member itself has been omitted.

FIGS. 9 and 10 show the two half links 29 and 30 of a transition coupler which in principle is of the same construction as the coupler in FIGS. 1 to 3, excepting that, viewed over the entire length of the locking member, the grooves are now located on alternately opposite sides of the half links 29, 30.

In FIGS. 11 and 12 the two half links 21 have grooves which run across the shanks of both links parallel to the median centre plane, but obliquely in relation to a plane through the half links normal to the median centre plane. Moreover, the grooves 28 are so positioned that the projections of their axes on the median centre plane of the half links intersect. This latter embodiment combines the advantage of substantial symmetry with that of providing favourable conditions of stress.

In order to enable the coupling elements 26 to be conveniently inserted and removed and nevertheless to be reliably held in their coupling positions it is preferred to lock them by means of locking members 31. One possible way of disposing these locking members is illustrated in FIGS. 1 and 2. Instead of providing locking members that are pin-shaped, these members could also be rings adapted yieldingly or positively to embrace the coupling elements.

A particularly simple locking arrangement comprising only one locking member 31 is illustrated in FIGS. 4 and 5 in which the locking member 31 urges the half links 21 apart and thereby indirectly seeks to wedge the coupling elements 26 in their bores.

The chain coupler according to FIGS. 13 to 15 comprises two U-shaped half links 41 having shanks 42 and 43. The ends 44 and 45 of the shanks of the half links 41 interfit. For this purpose the ends 44 form sockets 46 for the reception of the plain ends of the cooperating shanks.

The two half links are held together by two coupling elements 47 which are relatively spaced in planes parallel to the principal plane of the coupler. The coupling elements intersect the cylindrical plain ends 45 in the region of lateral transverse grooves 48 which, viewed in the lengthwise direction of the shanks, are relatively staggered. Part of the coupling elements 47 projects into the grooves 48, whereas another part is contained in bores 49 traversing the sockets 46.

In order to keep the coupling elements 47 in position a locking insert 51 made of an elastic material or provided with a tightly fitting bush 50 is located in the interior of the chain coupler. This insert frictionally embraces the coupling elements 47 and keeps them in their prescribed positions. Since the grooves 48 are staggered in the lengthwise direction of the shanks, the ends of the shanks are not materially weakened by the presence of the grooves 18, and the forces they are required to transmit may be comparatively large without any risk of the ends of the shanks being fractured or the coupling elements shearing off. The strength of the proposed chain coupler is further improved by virtue of the ends 44 of the shanks containing the sockets 46 having a substantially rectangular external cross section, as will be understood from FIG. 15. This rectangular shape also facilitates the provision of the transverse bores 49.

The last described chain coupler is particularly simple and compact and permits major forces to be reliably transmitted. Assembly is also simple and the number of parts is small.

We claim:

1. A chain coupler for interconnecting the end links of two chain lengths of the kind including two cooperating half links, with each half link having at least one cylindrical leg shank portion adapted to be inserted within a cylindrical sleeve-like socket of an element fixedly associated with the cooperating half link, characterised in that each cylindrical leg shank portion has grooves on opposite sides which are staggered in the coupling direction, there being correspondingly disposed apertures in the element with the sleeve-like socket for the receipt of locking pins which engage in the grooves to lock the cylindrical leg shank portion in the socket in which it is inserted.

2. A chain coupler comprising two half links having legs insertable in sockets of a coupling element interposed between the half links, said half links each being provided with grooves on oppostie sides of each of their legs which are to be connected together, the coupling elements being apertured to receive coupling pins and part of the circumference of each coupling pin projecting into one of said grooves, characterised in that the grooves on the opposite sides of each leg and the corresponding apertures in the coupling element are staggered in the coupling direction.

3. A chain coupler according to claim 2, characterised in that the grooves extend across the shanks of the two U-shaped half links parallel to the median centre plane of the coupling.

4. A chain coupler according to claim 2, characterised in that the grooves extend at an angle to a plane normal to the median centre plane of the half links.

5. A chain coupler according to claim 2, characterised in that the axes of pairs of grooves of a U-shaped half link align.

6. A chain coupler according to claim 4, characterised in that the grooves are so disposed that the projections of their axes in the median centre plane of the half links intersect.

7. A chain coupler according to claim 2, characterised in that the grooves extend across the shanks of the two U-shaped half links in a direction perpendicular to the centre axis of the coupler in the coupling direction.

8. A chain coupler according to claim 7, characterised in that the grooves in the ends of the shanks of the half links are located on the insides of the shanks.

9. A chain coupler according to claim 7, characterised in that the grooves in the ends of the shanks of the half links are located on the outside of the shanks.

10. A chain coupler according to claim 1, characterised in that the coupler includes an elastic locking element for locking the locking pin in position.

11. A chain coupler according to claim 1, characterised in that said half links are U-shaped and have two shanks, one shank of one said half link being provided with a socket for the reception of a plain end of a leg shank of the other half link, and the other shank of the first half link has a similar plain end insertable into a corresponding socket in the end of the first mentioned link, and that the sockets are intersected by at least two transverse bores for locking pins and the plain ends which fit into the sockets are provided on opposite sides with grooves staggered in the lengthwise direction of the shanks and adapted to receive part of the circumference of the locking pins.

12. A chain coupler according to claim 11, characterised in that the locking pins are arranged to extend parallel to a plane containing the centre lines of the shanks of the half links.

13. A chain coupler according to claim 12, characterised in that each locking pin passes through the ends of both shanks, whereas a region of each pin that is intermediate between the shanks containing the sockets is embedded in a resilient element.

14. A chain coupler according to claim 11, characterised in that the shank ends containing the sockets have a substantially rectangular external contour.

* * * * *